US008898193B2

(12) United States Patent  (10) Patent No.: US 8,898,193 B2
Ikeda et al.  (45) Date of Patent: Nov. 25, 2014

(54) METHOD AND APPARATUS FOR CONTROLLING REPLICATION PROCESSING OF OBJECT

(75) Inventors: Tatsuro Ikeda, Fuchu (JP); Koji Okada, Tokyo (JP); Norikazu Hosaka, Fuchu (JP); Fumihiko Sano, Kawasaki (JP); Toshio Okamoto, Tokyo (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 57 days.

(21) Appl. No.: 13/181,937

(22) Filed: Jul. 13, 2011

(65) Prior Publication Data

US 2012/0016907 A1   Jan. 19, 2012

(30) Foreign Application Priority Data

Jul. 13, 2010 (JP) ................................ 2010-159035

(51) Int. Cl.
*G06F 17/30* (2006.01)
*G06F 21/10* (2013.01)
(52) U.S. Cl.
CPC ........ *G06F 21/10* (2013.01); *G06F 2221/2141* (2013.01); *G06F 17/30165* (2013.01); *G06F 2221/2105* (2013.01); *G06F 17/30575* (2013.01)
USPC ............ 707/783; 707/626; 707/638; 707/785
(58) Field of Classification Search
CPC ..................... G06F 17/30165; G06F 17/30575
USPC ......... 707/783, 610, 626, 636, 655, 668, 694, 707/638, 736, 781, 785, 1, 100
See application file for complete search history.

(56) References Cited

U.S. PATENT DOCUMENTS

| 7,350,237 B2* | 3/2008 | Vogel et al. ..................... 726/27 |
| 7,801,861 B2* | 9/2010 | Wong et al. ................... 707/659 |
| 7,950,066 B1* | 5/2011 | Zuili ............................... 726/33 |
| 8,185,548 B2* | 5/2012 | Lim ............................... 707/781 |
| 2006/0010500 A1* | 1/2006 | Elazar et al. ..................... 726/27 |
| 2009/0025063 A1* | 1/2009 | Thomas ............................. 726/4 |
| 2009/0100109 A1* | 4/2009 | Turski et al. ................... 707/200 |

* cited by examiner

*Primary Examiner* — Fred I Ehichioya
*Assistant Examiner* — Dangelino Gortayo
(74) *Attorney, Agent, or Firm* — Oblon, Spivak, McClelland, Maier & Neustadt, L.L.P.

(57) ABSTRACT

According to one embodiment, the resource access unit accesses a first resource including a replication target object and policy data assigned to the object. The policy data includes base policy data including a first condition and assertion policy data including a second condition. The first retrieval unit obtains first attribute data for accessing the first resource. The first policy evaluation unit determines whether the first attribute satisfies the first condition. When the first condition is satisfied, the copy processing unit executes the copy processing for copying the object. The second retrieval unit obtains the second attribute data for accessing the second resource. The second policy evaluation unit determines whether the second attribute data satisfies the second condition. When the second condition is satisfied, the paste processing unit executes paste processing for pasting the object to the second resource.

3 Claims, 10 Drawing Sheets

```xml
<?xml version="1.0"?>
<PolicySet PolicyCombiningAlgId="ordered-permit-overrides" PolicySetId="root">
  <Target>
    <Actions>
      <Action>
        <ActionMatch MatchId="function:string-equal">
          <AttributeValue>
            Copy
          </AttributeValue>
          <ActionAttributeDesignator AttributeId="action:action-id"/>
        </ActionMatch>
      </Action>
    </Actions>
    <Resources>
      <Resource>
        <ResourceMatch MatchId="function:string-equal">
          <AttributeValue>
            object1
          </AttributeValue>
          <ResourceAttributeDesignator AttributeId="resource:resource-id"/>
        </ResourceMatch>
      </Resource>
    </Resources>
  </Target>
```

FIG. 4

```
<Policy RuleCombiningAlgId="ordered-permit-overrides" PolicyId="policy1">
  <Target>
    <Subjects>
      <Subject>
        <SubjectMatch MatchId="function:string-equal">
          <AttributeValue>
            user0001
          </AttributeValue>
          <SubjectAttributeDesignator AttributeId="subject:subject-id"/>
        </SubjectMatch>
      </Subject>
    </Subjects>
  </Target>
  <Rule Effect="Permit" RuleId="rule1"/>
  <Obligations>
    <Obligation ObligationId="obligation1" FulfillOn="Permit">
      <AttributeAssignment AttributeId="assertion-policy-id">
        assertionpolicy1
      <AttributeAssignment>
    </Obligation>
  </Obligations>
</Policy>
```

FIG. 5

```
<Policy RuleCombiningAlgId="ordered-permit-overrides" PolicyId="policy2">
  <Target>
    <Subjects>
      <Subject>
        <SubjectMatch MatchId="function:string-equal">
          <AttributeValue>
            user0002
          </AttributeValue>
          <SubjectAttributeDesignator AttributeId="subject:subject-id"/>
        </SubjectMatch>
      </Subject>
    </Subjects>
  </Target>
  <Rule Effect="Permit" RuleId="rule2"/>
  <Obligations>
    <Obligation ObligationId="obligation2" FulfillOn="Permit">
      <AttributeAssignment AttributeId="assertion-policy-id">
        assertionpolicy2
      </AttributeAssignment>
    </Obligation>
  </Obligations>
</Policy>

<Policy RuleCombiningAlgId="deny-overrides"PolicyId=" deny-all-others">
  <Target/>
  <Rule Effect="Deny"RuleId=" deny-all-others"/>
</Policy>

</PolicySet>
```

FIG. 6

```xml
<?xml version="1.0"?>
<PolicySet PolicyCombiningAlgId="ordered-permit-overrides" PolicySetId="root">
  <Target>
    <Actions>
      <Action>
        <ActionMatch MatchId="function:string-equal">
          <AttributeValue>
            Paste
          </AttributeValue>
          <ActionAttributeDesignator AttributeId="action:action-id"/>
        </ActionMatch>
      </Action>
    </Actions>
  </Target>
  <Policy RuleCombiningAlgId="ordered-permit-overrides" PolicyId="policy3">
    <Target>
      <Subjects>
        <Subject>
          <SubjectMatch MatchId="function:string-equal">
            <AttributeValue>
              user0001
            </AttributeValue>
            <SubjectAttributeDesignator AttributeId="subject:subject-id"/>
          </SubjectMatch>
        </Subject>
      </Subjects>
```

FIG. 7

```
        <Resources>
          <Resource>
            <ResourceMatch MatchId="function:string-equal">
              <AttributeValue>
                secret
              </AttributeValue>
              <ResourceAttributeDesignator AttributeId="resource:resource-type"/>
            </ResourceMatch>
          </Resource>
        </Resources>
      </Target>
      <Rule Effect="Permit" RuleId="rule3"/>
  </Policy>

<Policy RuleCombiningAlgId="deny-overrides" PolicyId="deny-all-others">
      <Target/>
      <Rule Effect="Deny" RuleId="deny-all-others"/>
  </Policy>

</PolicySet>
```

FIG. 8

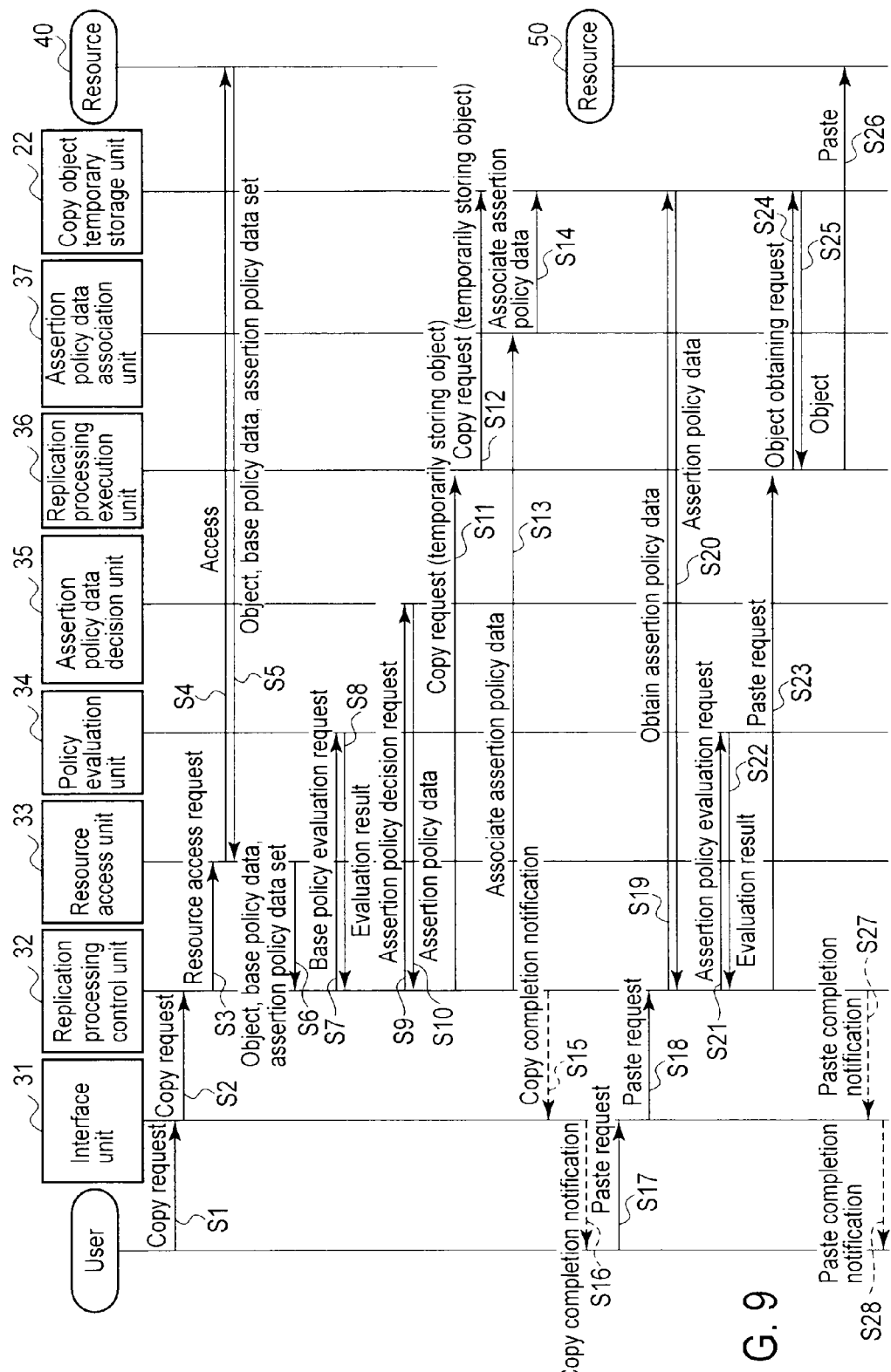
F I G. 9

```
<Request>
  <Subject SubjectCategory="subject-category:access-subject">
    <Attribute AttributeId="subject:subject-id">
      <AttributeValue>
        user0001
      </AttributeValue>
    <Attribute>
  <Subject/>
  <Action>
    <Attribute AttributeId="action:action-id">
      <AttributeValue>
        Copy
      </AttributeValue>
    <Attribute>
  </Action>
  <Resource>
    <Attribute AttributeId="resource:resource-id">
      <AttributeValue>
        object1
      </AttributeValue>
    <Attribute>
  </Resource>
  <Environment/>
</Request>
```

FIG. 10

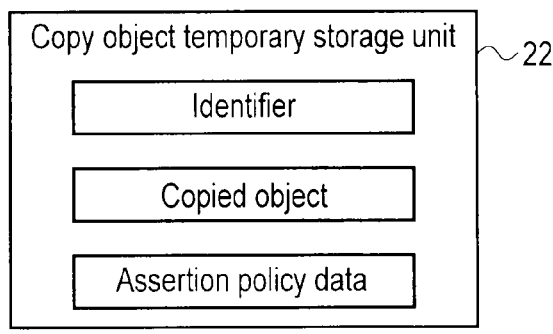

FIG. 11

```
<Request>
  <Subject SubjectCategory="subject-category:access-subject">
    <Attribute AttributeId="subject:subject-id">
      <AttributeValue>
        user0001
      </AttributeValue>
    <Attribute>
  <Subject/>
  <Action>
    <Attribute AttributeId="action:action-id">
      <AttributeValue>
        Paste
      </AttributeValue>
    <Attribute>
  </Action>
  <Resource>
    <Attribute AttributeId="resource:resource-type">
      <AttributeValue>
        secret
      </AttributeValue>
    <Attribute>
  </Resource>
  <Environment/>
</Request>
```

FIG. 12

METHOD AND APPARATUS FOR CONTROLLING REPLICATION PROCESSING OF OBJECT

CROSS-REFERENCE TO RELATED APPLICATIONS

This application is based upon and claims the benefit of priority from prior Japanese Patent Application No. 2010-159035, filed Jul. 13, 2010, the entire contents of which are incorporated herein by reference.

FIELD

Embodiments described herein relate generally to a method and an apparatus for controlling replication processing of an object of a resource.

BACKGROUND

Recently, access control techniques for controlling particular data and action on the basis of privilege data are increasingly becoming important. For example, access control of action possibility format is widely used.

An example of access control of action possibility format includes access control using privilege data on a document file as a security attribute. Privilege data on a document file assigned to a user is described as action possibility formats such as "viewing allowed" or "editing allowed". Examples of this kind of privilege data are known to include access control matrix and access control list.

However, in the access control in the action possibility format, it is difficult to describe flexible access control contents such as conditions about an allowed access time or an allowed access location or detailed functional limitation.

Therefore, in recent years, not only the access control in the action possibility format but also access control in access control policy format is used. The access control policy is a set of access control rules, and standard description specifications are disclosed to the public. In the access control in the access control policy format, allowed conditions or detailed functional limitations can be described.

In the access control in the access control policy format, it is determined whether a file is allowed to be opened or not by evaluating an access control policy on the basis of attribute data about access, when an access request to a document file is received, for example. Then, a control such as limitation to a function defined in the access control policy may be made. It should be noted that the access control policy is associated with, for example, each document file.

This kind of technique is also generally referred to as digital rights management (DRM).

By the way, many of currently-known DRM techniques and products thereof aim to protect data of a file format, and for example, objects in a document file (data objects constituting a document such as character strings or images) are uniformly controlled (i.e., all of them are allowed or all of them are disallowed).

In this case, in view of data leakage countermeasure, it is important to control replication (processing) of data.

However, when protection is made in units of files, for example, this greatly reduces the convenience in an application in which each object within a document file is frequently reused such as drawing design support application.

For example, in a case of a design drawing, the degree of importance may be different according to each object (for example, particular component design data or numerical value data). Therefore, even when an object is reused, it is necessary to perform control according to each object (in particular, control of replication).

In contrast, it may be possible to apply the above access control (the access control in the access control policy format) to all the objects.

In this case, the replication processing generally includes two instances of processing (actions), i.e., copy processing (COPY) and paste processing (PASTE). In the copy processing, an object belonging to a resource of replication source (an object in a source document file) is copied to a temporary data storage region (such as clipboard), and in the paste processing, the object is pasted to a resource of replication destination (a destination document file), whereby the replication processing is completed.

In this case, at the time of the copy processing, the resource of the replication destination may not clear, and therefore, attribute data needed for evaluating access control policy may be missing at this moment. In general, in order to determine access determination in access control, various kinds of attribute data are often used as factors serving as basis of determination. Examples of such attribute data include an identifier of a subject making access, role of the subject making access, the degrees of importance of the resource of replication source and replication destination, the type of resource, access time, access location, and the like.

The above attribute data is usually obtained when an action to a resource occurs. In other words, the value of the attribute data may be changed between the time of the copy processing and the paste processing, and the access determination may not be appropriately made in the access control.

Further, at the time of paste processing, the resource of the replication source is not always clear. Thus, at the time of the paste processing, the access control policy itself associated with the resource of the replication source (the document file to be replicated) cannot be always looked up. Therefore, the access determination may not be appropriately made in the access control.

BRIEF DESCRIPTION OF THE DRAWINGS

FIG. 4 is a view illustrating an example of a data structure of base policy data constituting policy data of the resource 40 shown in FIG. 2;

FIG. 5 is a view illustrating an example of a data structure of base policy data constituting policy data of the resource 40 shown in FIG. 2;

FIG. 6 is a view illustrating an example of a data structure of base policy data constituting policy data of the resource 40 shown in FIG. 2;

FIG. 7 is a view illustrating an example of a data structure of assertion policy data constituting policy data of the resource 40 shown in FIG. 2;

FIG. 8 is a view illustrating an example of a data structure of assertion policy data constituting policy data of the resource 40 shown in FIG. 2;

FIG. 9 is a sequence chart illustrating processing procedure of the object replication control apparatus 30 according to the present embodiment;

FIG. 10 is a view illustrating an example of a data structure of a base policy evaluation request notified by a replication processing control unit 32 to an policy evaluation unit 34;

FIG. 11 is a diagram illustrating an example of a data structure of a copy object temporary storage unit 22; and FIG. 12 is a view illustrating an example of a data structure of a assertion policy evaluation request notified by the replication processing control unit 32 to the policy evaluation unit 34.

DETAILED DESCRIPTION

In general, according to one embodiment, an object replication control apparatus includes a resource access unit, a first retrieval unit, a first policy evaluation unit, a copy processing unit, a database, a second retrieval unit, a second policy evaluation unit, and a paste processing unit. The resource access unit accesses a first resource including a replication target object and policy data assigned to the object, in order to obtain the replication target object specified by a user and the policy data assigned to the object. The policy data includes base policy data including a first condition for allowing the copy processing and assertion policy data associated with the base policy data and including a second condition for allowing the paste processing. The first retrieval unit obtains first attribute data for accessing the first resource. The first policy evaluation unit determines whether the first attribute data obtained by the first retrieval unit satisfies the first condition included in the base policy data included in the policy data obtained by the resource access unit. When the first condition is satisfied, the copy processing unit executes the copy processing for copying the object obtained by the resource access unit. The database stores the copied object obtained as a result of execution of the copy processing and the assertion policy data included in the policy data obtained by the resource access unit, wherein the object and the assertion policy data are associated with each other. The second retrieval unit obtains the second attribute data for accessing the second resource specified by the user. The second policy evaluation unit determines whether the second attribute data obtained by the second retrieval unit satisfies the second condition included in the assertion policy data stored in the database in association with the object copied as a result of execution of the copy processing. When the second condition is satisfied, the paste processing unit executes paste processing for pasting the object, copied by executing the copy processing, stored in the database to the second resource.

Embodiments will be hereinafter explained with reference to the drawings.

Figure 1:
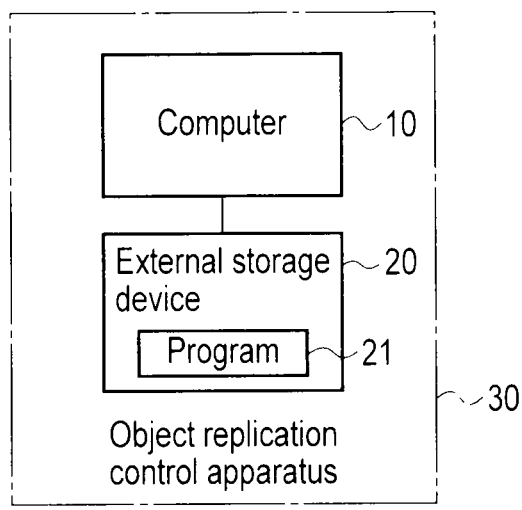
FIG. 1 is a block diagram illustrating a hardware configuration of an object replication control apparatus according to an embodiment.

FIG. 1 is a block diagram illustrating a hardware configuration of an object replication control apparatus according to the present embodiment. As shown in FIG. 1, a computer 10 is connected to an external storage device 20 such as a hard disk drive (HDD). The external storage device 20 stores a program 21 which is executed by the computer 10. The computer 10 and external storage device 20 constitute an object replication control apparatus 30.

This object replication control apparatus 30 has a function of controlling the replication processing of an object to be replicated (object to be subjected to the replication processing). The replication processing includes the copy processing for copying an object to be replicated and a paste processing for pasting (transferring) the copied object.

Note that the object replication control apparatus 30 according to the present embodiment is operated on the basis of a replication request sent from, for example, a user or an application.

Figure 2:
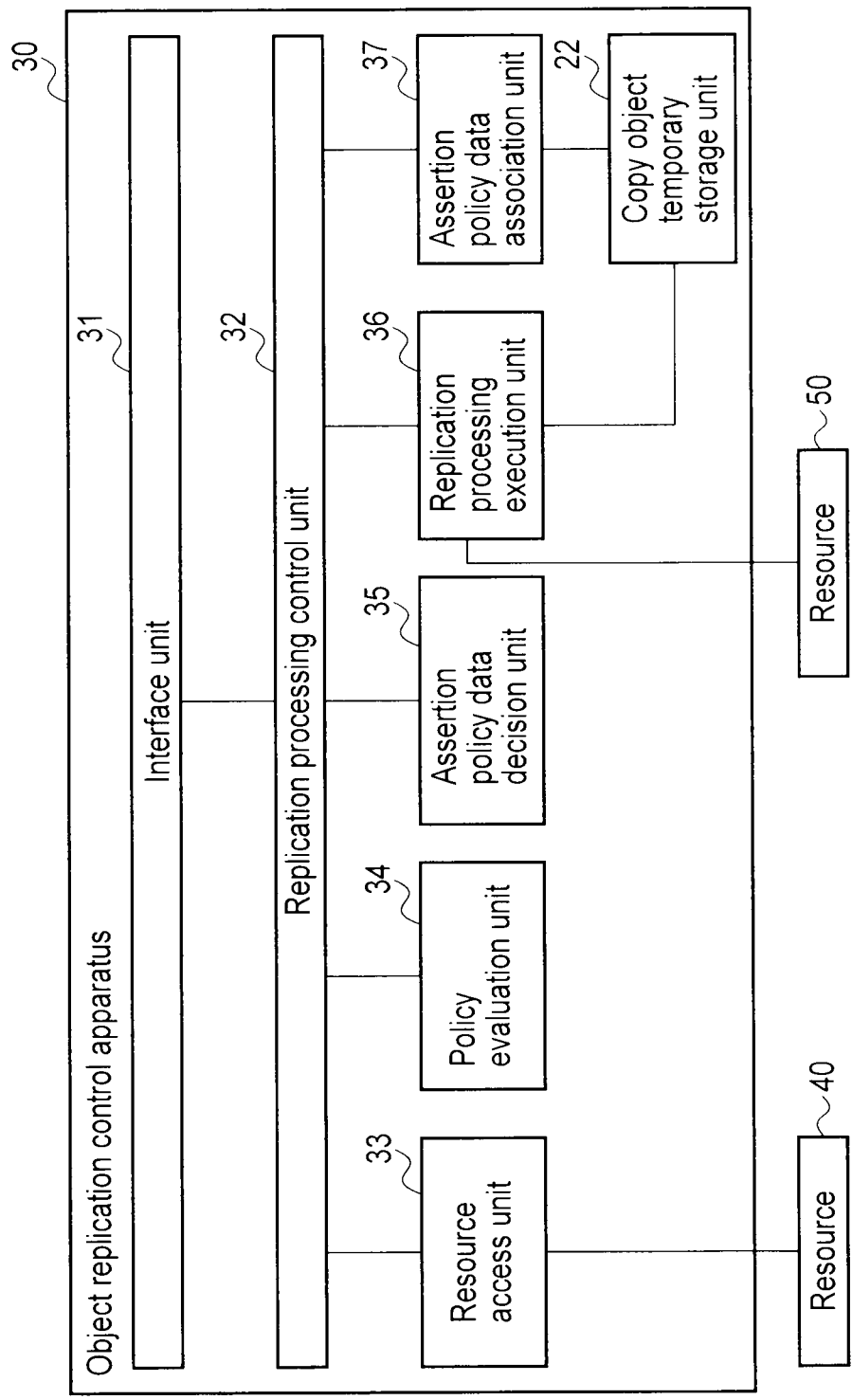
FIG. 2 is a block diagram mainly illustrating a functional configuration of an object replication control apparatus 30 shown in FIG. 1.

FIG. 2 is a block diagram mainly illustrating a functional configuration of the object replication control apparatus 30 shown in FIG. 1.

As shown in FIG. 2, the object replication control apparatus 30 includes an interface unit 31, a replication processing control unit 32, a resource access unit 33, a policy evaluation unit 34, a assertion policy data decision unit 35, a replication processing execution unit 36, and a assertion policy data association unit 37. In the present embodiment, it is assumed that the units 31 to 37 are respectively realized by the execution of the program 21 stored in the external storage device 20 by the computer 10 shown in FIG. 1. The program 21 may be stored in a computer-readable memory medium in advance and may be distributable. This program 21 may be downloaded to the computer 10, for example, via a network.

Further, the object replication control apparatus 30 includes a copy object temporary storage unit 22. In the present embodiment, the copy object temporary storage unit 22 is stored in the external storage device 20, for example.

In this explanation, it is assumed that the object replication control apparatus 30 according to the present embodiment is operated by a user, i.e., an operator in general. Alternatively, the object replication control apparatus 30 may be operated using an electronic message and the like transmitted from any device other than an operator in general. In this case, examples of such devices include a device arranged outside of the object replication control apparatus 30, a device arranged in the object replication control apparatus 30, and a device arranged in a device in which the object replication control apparatus 30 is arranged.

In the explanation below, the object replication control apparatus 30 executes processing for replicating an object of a resource 40 (first resource) to a resource 50 (second resource) as shown in FIG. 2.

It should be noted that the resource 40 includes an object and policy data assigned to the object. The policy data of the resource 40 includes base policy data and assertion policy data. The base policy data includes a matching condition (first condition) for allowing copy processing of an object assigned to the policy data. The assertion policy data includes a matching condition (second condition) for allowing paste processing of the object associated with the base policy data.

In the present embodiment, the object of the resource 40 is assumed to be, for example, an individual object in the document file (any data object constituting a document such as a character string or an image). It should be noted that the objects of the resource 40 may be, for example, in units of documents.

The copy object temporary storage unit 22 is a functional unit for temporarily storing (holding) an object copied as a result of copy processing. The copy object temporary storage unit 22 stores the copied object explained later and the assertion policy data determined by the assertion policy data decision unit 35, in such a manner that the copied object and the assertion policy data are associated with each other.

The interface unit 31 is a functional unit for receiving a user's request of replication processing of an object (hereinafter referred to as replication request). The interface unit 31 is, for example, a graphical user interface (GUI) and a command line user interface (CUI). However, the interface unit 31 may be in any form of interface.

The interface unit 31 receives a copy request and a paste request as a replication request. In the copy request, execution of copy processing constituting replication processing of an object is requested. In the paste request, execution of paste processing constituting replication processing of an object is requested. In the replication request, the copy request is made first and then the paste request is made.

In the present embodiment, it is assumed that the interface unit 31 directly receives requests from users. Alternatively, for example, the interface unit 31 may monitor a particular event of an application. In other words, the interface unit 31 may operate in response to replication processing of an object.

An object addressed by a replication request received by the interface unit 31 (i.e., an object to be subjected to the replication processing) will be hereinafter referred to as a replication target object. This replication target object is the object specified by the user during the replication request, for example.

The replication processing control unit 32 is a functional unit for controlling the overall processing to be executed in accordance with the replication request received by the interface unit 31. The replication processing control unit 32 determines whether the replication processing is actually executed or not (i.e., giving allowance or denial of the replication processing).

In the explanation about the present embodiment, for the sake of convenience, the replication processing control unit 32 performs inter-action control between the functional units other than the replication processing control unit 32. However, the embodiment may also be configured such that the functional units interact with each other.

The resource access unit 33 is a functional unit for accessing the resource 40 having the replication target object (and a plurality of objects including the replication target object) in accordance with the copy request received by the interface unit 31.

The resource access unit 33 accesses the resource 40 to obtain the replication target object stored in the resource 40 and the policy data assigned to the replication target object.

In the explanation about the present embodiment, the policy data as well as the replication target object is arranged within the resource 40. Alternatively, the policy data may be arranged outside of the resource 40 (for example, in a file system, a database, a repository, or the like arranged in and out of the object replication control apparatus 30). In this case, the resource access unit 33 may be additionally provided with means for obtaining the policy data assigned to the replication target object. In other words, when the replication target object is obtained via the resource access unit 33, any configuration may be employed as long as the policy data assigned to the replication target object can be obtained.

As described above, the replication target object and the policy data obtained by the resource access unit 33 are stored in the object replication control apparatus 30, and are more preferably stored within the replication processing control unit 32 until at least the copy processing is completed.

The policy evaluation unit 34 is a functional unit for evaluating the assertion policy data and the base policy data constituting the policy data obtained by the resource access unit 33 (for example, the policy data stored in the replication processing control unit 32). The policy evaluation unit 34 evaluates the policy data in accordance with an evaluation request of the policy data explained later (the base policy evaluation request and the assertion policy evaluation request).

In this case, for example, the replication processing control unit 32 previously stores attribute data (first attribute data) for accessing the resource 40 (first resource) and attribute data (second attribute data) for accessing the resource 50 (second resource).

In this case, the policy evaluation unit 34 obtains the attribute data about access to the resource 40 from the replication processing control unit 32. The policy evaluation unit 34 determines whether the obtained attribute data about the access to the resource 40 satisfies the matching condition (first condition) included in the base policy data constituting the policy data obtained by the resource access unit 33.

On the other hand, the policy evaluation unit 34 obtains the attribute data about access to the resource 50 from the replication processing control unit 32. The policy evaluation unit 34 determines whether the obtained attribute data about the access to the resource 50 satisfies the matching condition (second condition) included in the assertion policy data stored in the copy object temporary storage unit 22.

The assertion policy data decision unit 35 is a functional unit for determining assertion policy data from among assertion policy data constituting the policy data obtained by the resource access unit 33, in accordance with the evaluation result (determination result) provided by the policy evaluation unit 34.

The replication processing execution unit 36 is a functional unit for executing replication processing on the replication target object obtained by the resource access unit 33.

The replication processing execution unit 36 executes copy processing for copying the replication target object obtained by the resource access unit 33. The replication processing execution unit 36 stores an object copied as a result of execution of the replication processing (hereinafter referred to as copied object) to the copy object temporary storage unit 22.

Further, the replication processing execution unit 36 executes paste processing for pasting the copied object stored in the copy object temporary storage unit 22 to the resource 50.

The assertion policy data association unit 37 is a functional unit for associating the copied object with the assertion policy data determined by the assertion policy data decision unit 35. The representation policy data association unit 37 stores the assertion policy data determined by the assertion policy data decision unit 35 and the copied object (copied object stored in the copy object temporary storage unit 22) to the copy object temporary storage unit 22, in such a manner that the assertion policy data and the copied object are associated with each other.

Subsequently, a configuration of policy data of the resource 40 shown in FIG. 2 will be explained with reference to FIG. 3.

Figure 3:
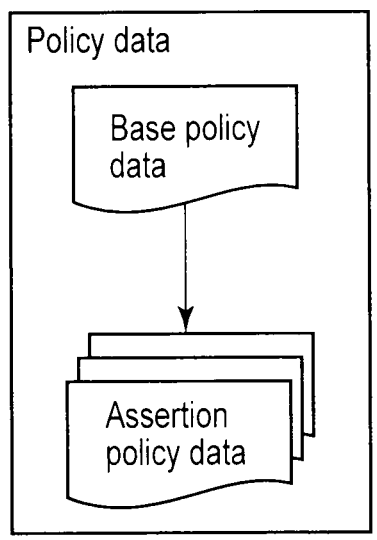
FIG. 3 is a diagram illustrating a configuration of policy data of a resource 40 shown in FIG. 2.

As shown in FIG. 3, the policy data is constituted by, for example, one piece of base policy data and one or more pieces of assertion policy data. In other words, the base policy data is associated with one or more pieces of assertion policy data.

In the present embodiment, the base policy data and the assertion policy data constituting the policy data is represented as a description format according to, for example, XACML V2.0 format. However, the base policy data and the assertion policy data may be represented in any form.

The data structure of the base policy data and the assertion policy data constituting the policy data of the resource 40 will be hereinafter explained with reference to FIGS. 4 to 8.

In the example of description of the base policy data and the assertion policy data explained below, constituent elements of name spaces, attributes, elements, or the like other than those needed in the present embodiment are omitted.

Each of the base policy data and the assertion policy data may be independent policy data (for example, a file and the like), or may be an internal constituent element of one piece of data (for example, an element in an XML document).

First, an example of data structure of the base policy data constituting the policy data of the resource 40 shown in FIG. 2 will be explained with reference to FIGS. 4 to 6.

The base policy data is data serving as a basis for determining whether the copy processing constituting the replication processing of the replication target object can be performed or not (determination as to whether the copy processing is allowed or not), and is data for determining the assertion policy data. The base policy data describes the matching condition for allowing the above copy processing.

As shown in FIGS. 4 to 6, the base policy data has one or more Policy elements. The base policy data may include a PolicySet element, i.e., data for enclosing one or more Policy elements. Alternatively, the PolicySet element may be configured to be included in other PolicySet elements.

For example, the Policy element and the PolicySet element of the base policy data include a Target element. The Target element describes a condition (matching condition) for determining whether the copy processing is allowed or not.

Examples of matching conditions (policy expressions) described in the Target element include at least one of constituent elements including "subject", "action", "resource", and "environment".

The "subject" means a subject of access execution, and is represented as Subject element. The "action" means the content of action of access execution, and is represented as Actions element. The "resource (resource)" means an object of access execution, and is represented as Resources element. The "environment" means environment of access execution.

In this case, Target element is used as an expression of the matching condition. Alternatively, when any matching condition that cannot be expressed as Target element (time, access location, and the like) is expressed, Condition element may be used.

Policy element of the base policy data includes Rule element. The Rule element describes fundamental content of access control in the replication processing (in this case, data as to whether the copy processing is allowed or not).

Further, Policy element of the base policy data includes Obligation element. In this Obligation element, obligation arising from access determination is described. In this case, Obligation element describes obligation of specifying assertion policy data. It should be noted that Obligations element is an element for enclosing a plurality of Obligation elements.

In the base policy data shown in FIGS. 4 to 6, three Policy elements are set. In the base policy data shown in FIGS. 4 to 6, these three Policy elements are enclosed by PolicySet element having "root" as an attribute value of PolicySetId attribute (hereinafter referred to as root policy set).

In the root policy set, Target element, i.e., a child element immediately thereunder, indicates that an action satisfying the matching condition is "Copy (copy processing)" and that a resource satisfying the matching condition is "object 1". This Target element indicates that, when "object 1", i.e., an object of the resource, is subjected to copy processing, this policy set (root policy set) is matched.

In other words, the policy data constituted by the base policy data shown in FIGS. 4 to 6 is policy data assigned to "object 1", i.e., the object of the resource.

In the example of the base policy data shown in FIGS. 4 to 6, actions other than the copy processing do not satisfy the matching condition, and are determined to be "Not Applicable".

For example, an identifier for identifying base policy data may be set as an attribute value of PolicySetId attribute of the root policy set.

Now, Policy element having "policy1" as an attribute value of PolicyId attribute (hereinafter referred to as policy 1) will be explained in the three Policy elements set in the base policy data shown in FIGS. 4 to 6.

Policy 1 indicates that policy 1 is Target element of a child element immediately thereunder and that an identifier for identifying access subject satisfying the matching condition is "user0001". The above indicates that policy 1 is matched when the identifier for identifying the access subject is "user0001". When the matching condition described in Target element included in this policy 1 is satisfied, Permit (an attribute value of Effect attribute of Rule element included in policy 1) is obtained as an evaluation result of the base policy data (effect of policy 1).

It should be noted that this Target element may be described in Rule element having "rule1" as an attribute value of RuleId attribute.

Further, policy 1 also includes Obligation element having "obligation1" as an attribute value of OblegationId attribute. This Obligation element represents obligation of specifying assertion policy data. The obligation represented in this Obligation element will be hereinafter referred to as assertion policy data-specified obligation 1.

In this case, an attribute value of FulfillOn attribute of Obligation element (assertion policy data-specified obligation 1) is "Permit". Therefore, when the effect of above policy 1 is "Permit" (i.e., the matching condition described in Target element included in policy 1 is satisfied), the assertion policy data-specified obligation 1 is matched.

In the above XACML V2.0 format, Obligation element can include an AttributeAssignment element as a child element. Therefore, AttributeId attribute of AttributeAssignment element indicates that the Obligation element is an obligation of specifying assertion policy data. Further, the value of AttributeAssignment element indicates specification of the assertion policy data.

In other words, in policy 1, the character string of "assertionpolicy1" represents a value for identifying the assertion policy data. For example, when the assertion policy data-specified obligation 1 is matched, the assertion policy data identified by the "assertionpolicy1" is specified.

The value for identifying the assertion policy data may be, for example, a file name storing the assertion policy data and a uniform resource identifier (URI) representing the assertion policy data.

The expression (obligation expression) of assertion policy data-specified obligation 1 is an example of expression according to the above XACML V2.0 format, and if the assertion policy data is explicitly specified, other expression formats may also be used.

Subsequently, Policy element having "policy2" as an attribute value of PolicyId attribute (hereinafter referred to as policy 2) will be explained in the three Policy elements set in the base policy data shown in FIGS. 4 to 6.

Policy 2 indicates that policy 2 is Target element of a child element immediately thereunder and that an identifier for identifying access subject satisfying the matching condition is "user0002". The above indicates that policy 2 is matched when the identifier for identifying the access subject is "user0002". When the matching condition described in Target element included in this policy 2 is satisfied, Permit (an attribute value of Effect attribute of Rule element included in policy 2) is obtained as an evaluation result of the base policy data (effect of policy 2).

Like above policy 1, policy 2 also includes Obligation element having "obligation2" as an attribute value of OblegationId attribute. This Obligation element represents obligation of specifying assertion policy data. The obligation represented in this Obligation element will be hereinafter referred to as assertion policy data-specified obligation 2.

In this case, an attribute value of FulfillOn attribute of Obligation element (assertion policy data-specified obligation 1) is "Permit". Therefore, when the effect of above policy 2 is "Permit" (i.e., the matching condition described in Target element included in policy 2 is satisfied), the assertion policy data-specified obligation 2 is matched.

The values of AttributeAssignment element, AttributeId attribute of AttributeAssignment element, and AttributeAssignment element included in Obligation element are the same as those of above policy 1, and detailed description thereabout is omitted.

In other words, in policy 2, the character string of "assertionpolicy2" represents a value for identifying the assertion policy data. For example, when the assertion policy data-specified obligation 2 is matched, the assertion policy data identified by the "assertionpolicy2" is specified.

As described above, for example, an obligation for specifying assertion policy data is arranged in Policy element (or PolicySet element), whereby assertion policy data can be specified in accordance with Policy element (and the matching condition described in Target element included therein).

Subsequently, Policy element having "deny-all-others" as an attribute value of PolicyId attribute (hereinafter referred to as denial policy) will be explained in the three Policy elements set in the base policy data shown in FIGS. 4 to 6.

The denial policy represents a policy for giving Deny (attribute value of Effect attribute of Rule element included in the denial policy) as an evaluation result of the base policy data (effect of the denial policy). In the base policy data shown in FIGS. 4 to 6, the attribute value of PolicyCombiningAlgId attribute in the root policy set indicates "ordered-permit-overrides". Therefore, in the base policy data shown in FIGS. 4 to 6, when there is no policy describing the satisfied matching condition, the denial policy described at the last of the root policy set is matched. More specifically, first, the matching condition describing policy 1 is determined, and then the matching condition describing policy 2 is determined, so that the determinations are made as to whether the matching conditions are satisfied or not. Only when none of matching conditions described in policies 1 and 2 is satisfied, the denial policy is matched.

In the above base policy data shown in FIGS. 4 to 6, it is assumed that Target element, i.e., a child element immediately under the root policy set, describes the matching condition of the resource. Alternatively, the resource matching condition may not be described in the root policy set, and may be described in each policy such as the first policy.

Subsequently, an example of data structure of assertion policy data representing policy data of the resource 40 shown in FIG. 2 will be explained with reference to FIGS. 7 and 8.

The assertion policy data is data serving as a basis for determining whether the paste processing constituting the replication processing of the replication target object can be performed or not (determination as to whether the paste processing is allowed or not). The assertion policy data describes matching condition for allowing the above paste processing.

The assertion policy data includes one or more Policy elements. The assertion policy data may have PolicySet element as data enclosing one or more Policy elements. Alternatively, the PolicySet element may be configured to be included in other PolicySet elements.

Policy element and PolicySet element of the assertion policy data include Target element. The Target element describes a condition (matching condition) for determining whether the paste processing is allowed or not.

As described above, matching conditions described in the Target element include at least one of constituent elements including "subject", "action", "resource", and "environment".

Policy element of assertion policy data includes Rule element. The Rule element describes fundamental content of access control in the replication processing (in this case, data as to whether the paste processing is allowed or not).

As described above, the assertion policy data has the same configuration as the above base policy data. As further explained below, it should be noted that difference between the assertion policy data and the base policy data is that the action for satisfying the matching condition is "Paste (paste processing)" and that the assertion policy data does not have Obligation element (i.e., obligation of specifying the assertion policy data). In the example of the assertion policy data shown in FIGS. 7 and 8, the matching condition of the resource is omitted in the root policy set.

In the example of the assertion policy data shown in FIGS. 7 and 8, two Policy elements are set. These two elements are enclosed by PolicySet element having "root" as an attribute value of PolicySetId attribute (hereinafter referred to as root policy set).

In the root policy set, Target element, i.e., a child element immediately thereunder, indicates that the action for satisfying the matching condition is "Paste (paste processing)". This Target element indicates that this policy set (root policy set) is matched in the paste processing. In the example of the assertion policy data shown in FIGS. 7 and 8, actions other than the paste processing do not satisfy the matching condition.

In this case, Policy element having "policy3" as an attribute value of PolicyId attribute (hereinafter referred to as policy 3) will be explained in two Policy elements set in the assertion policy data shown in FIGS. 7 to 8.

Policy 3 indicates that policy 3 is Target element of a child element immediately thereunder, that an identifier for identifying access subject satisfying the matching condition is "user0001", and that the type of the destination resource is "secret". The above indicates that policy 3 is matched when the identifier for identifying the access subject is "user0001" and the type of the destination resource is "secret". When the matching condition described in Target element included in this policy 3 is satisfied, Permit (an attribute value of Effect attribute of Rule element included in policy 3) is obtained as an evaluation result of the assertion policy data (effect of policy 3).

It should be noted that this Target element may be described in Rule element having "rule3" as an attribute value of RuleId attribute.

It should be noted that Policy element having "deny-all-others" as an attribute value of PolicyId attribute in the two Policy elements set in the assertion policy data shown in FIGS. 7 and 8 are the same as the denial policy in the base policy data shown in FIGS. 4 to 6 explained above, and detailed description thereabout is omitted.

In the explanation about the example of the assertion policy data shown in FIGS. 7 and 8, the paste processing is allowed only when the access subject identified by the identifier "user0001" executes paste processing with regard to the resource whose type of resource is "secret". Alternatively, any condition other than the above may be set as determination reference based on which determination is made as to whether the paste processing is allowed or not.

Subsequently, processing procedure performed by the object replication control apparatus 30 according to the present embodiment will be explained with reference to the sequence chart of FIG. 9.

First, a user operates the object replication control apparatus 30 to request the object replication control apparatus 30 to execute copy processing constituting replication processing of a replication target object. In this case, the replication target object is assumed to be an object of the resource 40. At this occasion, it is desirable for the user to specify, for example, a resource of a replication source (i.e., the resource 40 having the replication target object) and a method for obtaining the replication target object (URI indicating the location of the replication target object and a protocol such as HTTP).

Accordingly, the interface unit 31 included in the object replication control apparatus 30 receives execution request of the copy processing (copy request) from the user (step S1). The copy request received by the interface unit 31 is notified to the replication processing control unit 32 (step S2).

When the replication processing control unit 32 receives the copy request from the interface unit 31, the replication processing control unit 32 notifies the resource access unit 33 of the resource access request to request access to the resource 40 having the replication target object (step S3).

The resource access unit 33 accesses the resource 40 having the replication target object in response to the request from the replication processing control unit 32 (resource access request) (step S4).

Therefore, the resource access unit 33 obtains the replication target object of the resource 40 and policy data assigned to the replication target object (step S5). The policy data obtained by the resource access unit 33 includes base policy data and one or more pieces of assertion policy data associated with the base policy data (hereinafter referred to as assertion policy data set).

The resource access unit 33 transfers the replication target object and the policy data (the base policy data and the assertion policy data set) obtained from the resource 40 to the replication processing control unit 32 (step S6).

When the replication processing control unit 32 receives the replication target object and the policy data from the resource access unit 33, the replication processing control unit 32 notifies the policy evaluation unit 34 of the base policy evaluation request, thereby requesting evaluation of the base policy data (step S7). At this occasion, the replication processing control unit 32 transfers the base policy data to the policy evaluation unit 34.

At this occasion, the base policy evaluation request notified from the replication processing control unit 32 to the policy evaluation unit 34 includes attribute data used for evaluation of the base policy data (attribute data about access to the resource 40, i.e., the resource of the replication source). For example, the attribute data includes data about a subject of access, an object of access, an action (content) of access, or environment about the access. For example, the attribute data is stored in the replication processing control unit 32 in advance.

FIG. 10 illustrates an example of a data structure of a base policy evaluation request notified by the replication processing control unit 32 to the policy evaluation unit 34.

For example, the base policy evaluation request shown in FIG. 10 includes "user0001" indicating an identifier for identifying a subject of access (subject executing access to the resource 40), "Copy" indicating an action of access (content of action of access execution to the resource 40), and "object1" indicating an object of access (object of the resource 40, i.e., object of access execution), which are included as attribute data.

The base policy evaluation request shown in FIG. 10 is an expression of Request element according to the above XACML V2.0 format, and detailed description thereabout is omitted.

Returning to FIG. 9, the policy evaluation unit 34 obtains the attribute data included in the base policy evaluation request notified by the replication processing control unit 32. The policy evaluation unit 34 uses the obtained attribute data to evaluate the base policy data transferred from the replication processing control unit 32. In this case, the policy evaluation unit 34 determines whether the obtained attribute data satisfies the matching condition included in the base policy data (matching condition described in Target element shown in FIGS. 4 to 6).

In this explanation, the policy evaluation unit 34 obtains the attribute data included in the base policy evaluation request. Alternatively, for example, the attribute data may be obtained within the policy evaluation unit 34. In other words, any configuration may be employed as long as the policy evaluation unit 34 can obtain the attribute data.

In this explanation, the base policy data is directly transferred from the replication processing control unit 32. Alternatively, for example, the replication processing control unit 32 may provide indirect reference data (such as a URI), and based on the reference data, the policy evaluation unit 34 may obtain the base policy data. In other words, any configuration may be employed as long as the policy evaluation unit 34 can obtain base policy data to be evaluated.

The policy evaluation unit 34 returns the evaluation result of the base policy data to the replication processing control unit 32 (step S8). This evaluation result of the base policy data has effects obtained when the base policy data is evaluated. More specifically, the evaluation result of the base policy data includes determination result ("Permit" or "Deny") indicating whether the matching condition included in the base policy data is satisfied or not. When the evaluation result of the base policy data includes "Permit", the evaluation result of the base policy data further includes matching assertion policy data-specified obligation (i.e., obligation described in Obligation element included in Policy element including Target element describing the matching condition).

Subsequently, the replication processing control unit 32 determines whether the evaluation result of the base policy data returned from the policy evaluation unit 34 includes "Permit" or not.

When the evaluation result of the base policy data is determined not to include "Permit" (i.e., "Deny" is included), the processing of the object replication control apparatus 30 is terminated. In this case, the user is notified via, for example, the interface unit 31 that the replication processing of the replication target object (and the copy processing constituting the replication processing) is denied.

On the other hand, when the evaluation result of the base policy data is determined to include "Permit", the replication processing control unit 32 notifies the assertion policy data decision unit 35 of an assertion policy decision request, thus requesting the determination of the assertion policy data (step S9). The assertion policy decision request notified to the assertion policy data decision unit 35 includes the above evaluation result of the base policy data.

The assertion policy data decision unit 35 obtains the evaluation result of the base policy data included in the assertion policy decision request notified from the replication processing control unit 32. The assertion policy data decision unit 35 determines assertion policy data from among the group of assertion policy data obtained from the resource 40 in step S5 explained above, in accordance with a content (i.e., value for identifying the assertion policy data) described in the assertion policy data-specified obligation included in the obtained evaluation result of the base policy data (i.e., Obligation element). In other words, the assertion policy data decision unit 35 determines assertion policy data from among the assertion policy data set, in accordance with the matching condition determined to be satisfied by the policy evaluation unit 34 (the matching condition included in the base policy data).

It should be noted that the assertion policy data set obtained from the resource 40 may be obtained from the replication processing control unit 32 in advance, or may be included in the assertion policy decision request notified by the replication processing control unit 32.

In response to the assertion policy decision request, the assertion policy data decision unit 35 notifies the determined assertion policy data to the replication processing control unit 32 (step S10).

Subsequently, the replication processing control unit 32 notifies the replication processing execution unit 36 of the copy request to request the copy processing of the replication target object (step S11). The copy request notified from the replication processing control unit 32 to the replication processing execution unit 36 includes the replication target object.

The replication processing execution unit 36 executes the copy processing for copying the replication target object included in the copy request notified by the replication processing control unit 32. The replication processing execution unit 36 stores (temporarily stores) the replication target object (copied object) copied as a result of execution of the copy processing to the copy object temporary storage unit 22 (step S12).

Subsequently, the replication processing control unit 32 notifies the assertion policy data association unit 37 of associating request to request the assertion policy data association unit 37 to associate the assertion policy data determined by the assertion policy data decision unit 35 (i.e., the assertion policy data notified by the assertion policy data decision unit 35) with the copied object (step S13). The associating request notified from the replication processing control unit 32 to the assertion policy data association unit 37 includes the assertion policy data determined by the assertion policy data decision unit 35.

The assertion policy data association unit 37 associates the assertion policy data included in the associating request notified by the replication processing control unit 32 with the copied object stored in the copy object temporary storage unit 22. In this case, the assertion policy data association unit 37 associates the assertion policy data included in the associating request with the copied object, and stores them to the copy object temporary storage unit 22. Alternatively, a table for associating the copied object and the assertion policy data may be stored to associate the copied object and the assertion policy data.

In this case, FIG. 11 illustrates an example of data structure of the copy object temporary storage unit 22. As shown in FIG. 11, the copy object temporary storage unit 22 stores the copied object and the assertion policy data in such a manner than they are associated with each other.

The copied object stored in the copy object temporary storage unit 22 is an entity of the replication target object copied after the replication processing execution unit 36 executes the copy processing as described above. For example, it may be in any form such as byte array data arranged on a memory or a URI for indirect reference.

On the other hand, the assertion policy data stored in the copy object temporary storage unit 22 is an entity of the assertion policy data determined by the assertion policy data decision unit 35 as described above, and may be in any form like the copied object.

In this manner, the copied object and the assertion policy data are associated with each other and stored to the copy object temporary storage unit 22, so that the copied object and the assertion policy data are associated with each other.

It should be noted that the copy object temporary storage unit 22 may store an identifier for identifying the copied object. This identifier is used, for example, when a plurality of copied objects are allowed to exist at a time. This identifier is generated by the replication processing control unit 32 when the replication processing execution unit 36 executes the copy processing, and it is preferably assigned to the replication target object (copied object) copied as a result of execution of the copy processing.

Returning back to FIG. 9 again, when the assertion policy data association unit 37 finishes associating the assertion policy data and the copied object with each other, the replication processing control unit 32 sends a notification to the interface unit 31 to notify that the copy processing constituting the replication processing of the replication target object is completed (hereinafter referred to as copy completion notification) (step S15). Further, the interface unit 31 notifies the copy completion notification provided by the replication processing control unit 32 to the user (step S16). It should be noted that the processing of steps S15 and S16 may be omitted.

Subsequently, the user operates the object replication control apparatus 30 to request the object replication control apparatus 30 to execute the paste processing constituting the replication processing of the replication target object (i.e., processing for pasting the above copied object). In this case, the copied object is assumed to be pasted to the resource 50. At this occasion, it is desirable for the user to specify, for example, a resource of replication destination (in this case, the resource 50) and a method for specifying the copied object to be subjected to the paste processing (URI indicating the location of the copied object and a paste protocol such as HTTP).

Accordingly, the interface unit 31 receives execution request of the paste processing (paste request) from the user (step S17). The paste request received by the interface unit 31 is notified to the replication processing control unit 32 (step S18).

When the interface unit 31 notifies the paste request, the replication processing control unit 32 accesses the copy object temporary storage unit 22 (step S19). Therefore, the replication processing control unit 32 obtains the assertion policy data (assertion policy data associated with the copied object to be subjected to the paste processing) stored in the copy object temporary storage unit 22 (step S20).

Subsequently, the replication processing control unit 32 notifies the policy evaluation unit 34 of the assertion policy evaluation request to request the policy evaluation unit 34 to evaluate the assertion policy data (step S21). At this occasion, the replication processing control unit 32 transfers the assertion policy data obtained from the copy object temporary storage unit 22 to the policy evaluation unit 34.

At this occasion, the assertion policy evaluation request notified from the replication processing control unit 32 to the policy evaluation unit 34 includes attribute data used for evaluation of the assertion policy data (attribute data about access to the resource 50, i.e., the resource of the replication destination). For example, the attribute data includes data about a subject of access, an object of access, an action (content) of access, or environment about the access. For example, the attribute data is stored in the replication processing control unit 32 in advance.

FIG. 12 illustrates an example of a data structure of a assertion policy evaluation request notified by the replication processing control unit 32 to the policy evaluation unit 34.

For example, the assertion policy evaluation request shown in FIG. 12 includes "user0001" indicating an identifier for identifying a subject of access (subject executing access to the resource 50), "Paste" indicating an action of access (content of action of access execution to the resource 50), and "secret" indicating the type of resource (the type of the resource 50, i.e., object of access execution), which are included as attribute data.

The assertion policy evaluation request shown in FIG. 12 is an expression of Request element according to the above XACML V2.0 format, like the defined policy evaluation request shown in FIG. 10 explained above, and detailed description thereabout is omitted.

Returning to FIG. 9, the policy evaluation unit 34 obtains the attribute data included in the assertion policy evaluation request notified by the replication processing control unit 32. The policy evaluation unit 34 uses the obtained attribute data to evaluate the assertion policy data transferred from the replication processing control unit 32. In this case, the policy evaluation unit 34 determines whether the obtained attribute data satisfies the matching condition included in the assertion policy data (matching condition described in Target element shown in FIGS. 7 to 8).

In this explanation, the policy evaluation unit 34 obtains the attribute data included in the assertion policy evaluation request. Alternatively, for example, the attribute data may be obtained within the policy evaluation unit 34. In other words, any configuration may be employed as long as the policy evaluation unit 34 can obtain the attribute data.

In this explanation, the assertion policy data is directly transferred from the replication processing control unit 32. Alternatively, for example, the replication processing control unit 32 may provide indirect reference data (such as a URI), and based on the reference data, the policy evaluation unit 34 may obtain the assertion policy data. In other words, any configuration may be employed as long as the policy evaluation unit 34 can obtain assertion policy data to be evaluated.

The policy evaluation unit 34 returns the evaluation result of the assertion policy data to the replication processing control unit 32 (step S22). This evaluation result of the assertion policy data has effects obtained when the assertion policy data is evaluated. More specifically, the evaluation result of the assertion policy data includes determination result ("Permit" or "Deny") indicating whether the matching condition included in the assertion policy data is satisfied or not.

Subsequently, the replication processing control unit 32 determines whether the evaluation result of the assertion policy data returned from the policy evaluation unit 34 includes "Permit" or not.

When the evaluation result of the assertion policy data is determined not to include "Permit" (i.e., "Deny" is included), the processing of the object replication control apparatus 30 is terminated. In this case, the user is notified via, for example, the interface unit 31 that the replication processing of the replication target object (and the paste processing constituting the replication processing) is denied.

On the other hand, when the evaluation result of the assertion policy data is determined to include "Permit", the replication processing control unit 32 notifies the replication processing execution unit 36 of a paste request, thus requesting the paste processing of the copied object (copied object stored in the copy object temporary storage unit 22) (step S23).

When the replication processing control unit 32 notifies the paste request, the replication processing execution unit 36 requests the copy object temporary storage unit 22 to obtain the copied object (step S24). Therefore, the replication processing execution unit 36 obtains the copied object stored in the copy object temporary storage unit 22 (step S25).

Subsequently, the replication processing execution unit 36 executes the paste processing for pasting the copied object obtained from the copy object temporary storage unit 22 to the resource specified as the resource of the replication destination side (in this case, the resource 50) (step S26).

When the replication processing execution unit 36 finishes the paste processing, the replication processing control unit 32 sends a notification to the interface unit 31 to notify that the paste processing constituting the replication processing of the replication target object is completed (hereinafter referred to as paste completion notification) (step S27). Further, the interface unit 31 notifies the paste completion notification provided by the replication processing control unit 32 to the user (step S28). It should be noted that the processing of steps S27 and S28 may be omitted.

In the above explanation of FIG. 9, the interface unit 31 receives the paste request in step S17. Alternatively, for example, the paste request as well as the copy request may be received at a time in step S1.

As described above, in the present embodiment, the resource 40 of the replication source is accessed, and the object, i.e., the replication target, and the policy data assigned to the object are obtained. Then, a determination is made as to whether the attribute data (first attribute data) about access to the resource 40 satisfies the matching condition (first condition) included in the base policy data constituting the policy data. When the attribute data is determined to satisfy the matching condition included in the base policy data, the assertion policy data is determined from among the assertion policy data constituting the policy data in accordance with the matching condition. In the present embodiment, the determined assertion policy data and the copied object (copied replication target object) are associated with each other and stored to the copy object temporary storage unit 22. In the present embodiment, a determination is made as to whether the matching condition (second condition) included in the assertion policy data stored in the copy object temporary storage unit 22 is satisfied or not. When the matching condition included in the assertion policy data is determined to be satisfied, the copied object stored in the copy object temporary storage unit 22 is pasted to the resource 50, i.e., the replication destination.

In other words, in the present embodiment, the base policy data is evaluated during the copy processing constituting the replication processing of the replication target object, and the assertion policy data associated with the base policy data according to the evaluation result is determined. Then, the determined assertion policy data and the copied object are associated with each other and stored to the copy object temporary storage unit 22. During the paste processing constituting the replication processing, the assertion policy data stored in the copy object temporary storage unit 22 is evaluated. Therefore, in the present embodiment, the replication processing of the object of the resource can be appropriately controlled in units of objects.

In the explanation about the present embodiment, the copied object is stored in the copy object temporary storage unit 22. Alternatively, the copied object may be stored in a storage unit (not shown) other than the copy object temporary storage unit 22 such as a file or a database, or the copied object may be configured to be arranged on a memory, for example.

It should be noted that the method described in the above embodiments can be distributed by storing, as a program that can be executed by a computer, in a storage media such as a magnetic disk (floppy (registered trademark) disk, hard disk, or the like), an optical disk (CD-ROM, DVD, or the like), a magneto-optical disk (MO), a semiconductor memory, or the like.

An OS (operating system), MW (middleware) such as database management software, network software, or the like, which runs on a computer, may execute some of the processes for achieving the above embodiments on the basis of instructions in the program which is installed from a storage medium.

Furthermore, the storage medium of the present embodiment is not limited to a medium independent of a computer, and includes a storage medium which stores or temporarily stores a program downloaded via a LAN, the Internet, or the like.

The number of storage media is not limited to one, and the storage medium of the present embodiment includes a case where the processes of the present embodiment are executed from a plurality of media. Hence, the medium configuration may be in any configuration.

A computer in the present embodiment executes respective processes in the above embodiment on the basis of a program stored in a storage medium, and may adopt either arrangement, i.e., a standalone apparatus such as a personal computer, or a system formed by connecting a plurality of apparatuses via a network.

The computer in the present embodiment is not limited to a personal computer, but includes an arithmetic processing device, microcomputer, or the like included in data processing apparatus, and collectively means apparatuses and devices that can achieve the functions of the present embodiment based on a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An object replication control apparatus, comprising:
a resource access unit configured to access a first resource including a replication target object and policy data assigned to the object, in order to obtain the replication target object specified by a user and the policy data assigned to the object, wherein the policy data includes base policy data including a first condition for allowing a copy processing and assertion policy data identification data for specifying assertion policy data and the assertion policy data associated with the base policy data and including a second condition for allowing a paste processing;
a first retrieval unit configured to obtain first attribute data for accessing the first resource;
a first policy evaluation unit configured to determine whether the first attribute data obtained by the first retrieval unit satisfies the first condition included in the base policy data included in the policy data obtained by the resource access unit and to determine the assertion policy data identification data specifying the assertion policy data in accordance with the first condition;
a copy processing unit configured to execute the copy processing for copying the object obtained by the resource access unit, when the first condition is satisfied;
a database configured to store the copied object obtained as a result of execution of the copy processing and the assertion policy data included in the policy data obtained by the resource access unit, wherein the object and the assertion policy data are associated with each other;
a second retrieval unit configured to obtain the second attribute data for accessing the second resource specified by the user;
a second policy evaluation unit configured to determine whether the second attribute data obtained by the second retrieval unit satisfies the second condition included in the assertion policy data stored in the database in association with the object copied as a result of execution of the copy processing;
a paste processing unit configured to execute the paste processing for pasting the object, copied by executing the copy processing, stored in the database to the second resource, when the second condition is satisfied; and
a determination unit,
wherein the policy data of the first resource includes the base policy data and one or more pieces of assertion policy data associated with the base policy data,
when the first condition is satisfied, the determination unit determines one of one or more pieces of assertion policy data included in the policy data obtained by the resource access unit, in accordance with the assertion policy data identification data determined by the first policy evaluation unit, and
the database stores the object copied as a result of execution of the copy processing and the determined assertion policy data, wherein the object and the assertion policy data are associated with each other.

2. The apparatus according to claim 1, wherein the first condition included in the base policy data includes, as a constituent element, at least one of a subject of access to the first resource, an object of the access, an action content of the access, and environment about the access,
the second condition included in the assertion policy data includes, as a constituent element, at least one of a subject of access to the second resource, an object of the access, an action content of the access, and environment about the access,
the first attribute data obtained by the first retrieval unit includes data about a subject of access to the first resource, an object of the access, an action content of the access, or environment about the access, and
the second attribute data obtained by the second retrieval unit includes data about a subject of access to the second resource, an object of the access, an action content of the access, or environment about the access.

3. An object replication control method, comprising:
accessing a first resource including a replication target object and policy data assigned to the object, in order to obtain the replication target object specified by a user and the policy data assigned to the object, wherein the policy data includes base policy data including a first condition for allowing a copy processing and assertion policy data identification data for specifying assertion policy data and the assertion policy data associated with the base policy data and including a second condition for allowing a paste processing;

obtaining first attribute data for accessing the first resource;

determining whether the obtained first attribute data satisfies the first condition included in the base policy data included in the obtained policy data and to determine the assertion policy data identification data specifying the assertion policy data in accordance with the first condition;

when the first condition is satisfied, executing the copy processing for copying the object obtained;

storing, to a database, the copied object obtained as a result of execution of the copy processing and the assertion policy data included in the obtained policy data, wherein the object and the assertion policy data are associated with each other;

obtaining second attribute data for accessing the second resource specified by the user;

determining whether the obtained second attribute data satisfies the second condition included in the assertion policy data stored in the database in association with the object copied as a result of execution of the copy processing;

when the second condition is satisfied, executing paste processing for pasting the object, copied by executing the copy processing, stored in the database to the second resource, wherein the policy data of the first resource includes the base policy data and one or more pieces of assertion policy data associated with the base policy data;

when the first condition is satisfied, determining one of one or more pieces of assertion policy data included in the obtained policy data, in accordance with the determined assertion policy data identification data; and storing the object copied as a result of execution of the copy processing and the determined assertion policy data, wherein the object and the assertion policy data are associated with each other.

* * * * *